United States Patent [19]

Solomon

[11] Patent Number: 5,388,154
[45] Date of Patent: Feb. 7, 1995

[54] ALPHABETIC TELEPHONE DIALER APPARATUS AND METHOD

[76] Inventor: William Solomon, 4818 W. Roscoe St., 2nd Flr., Chicago, Ill. 60641

[21] Appl. No.: 173,349

[22] Filed: Dec. 23, 1993

[51] Int. Cl.⁶ .......................................... H04M 11/00
[52] U.S. Cl. .................................... 379/368; 379/52; 379/97; 379/98; 379/99
[58] Field of Search ...................... 379/368, 52, 97, 98, 379/99, 354, 355; 341/22, 20; 364/188, 189

[56] References Cited

U.S. PATENT DOCUMENTS

| D. 337,570 | 7/1993 | Bevilacqua et al. | D14/101 |
| 4,839,919 | 6/1989 | Borges et al. | 379/98 |
| 4,991,199 | 2/1991 | Parekh et al. | 379/97 |
| 5,008,927 | 4/1991 | Weiss et al. | 379/98 |

OTHER PUBLICATIONS

Copy of brochure entitled "Future Communicator!" dated Early Summer '94.

Primary Examiner—James L. Dwyer
Assistant Examiner—Jacques M. Saint-Surin
Attorney, Agent, or Firm—Fitch, Even, Tabin & Flannery

[57] ABSTRACT

A telephone dialing method relating each key of an alphabetic keyboard to a numeric digit and a telephone dialing apparatus and alphabetic keyboard device for sending dual-tone-multi-frequency (DTMF) and/or pulse telephone dialing signals over a communication path such as a local loop connecting a subscriber telephone to a switching office via a telephone dialing circuit. The alphabetic keyboard device may be configured according to a conventional typewriter QWERTY keyboard layout and is connectable to a conventional telephone to supplement its 12-key standard keypad, allowing the telephone to be dialed with individual alphabetic letters.

15 Claims, 3 Drawing Sheets

ALPHABETIC TELEPHONE DIALER APPARATUS AND METHOD

BACKGROUND OF THE INVENTION

The present invention relates to an apparatus and method for generating telephone dialing signals. More particularly the invention relates to providing an alphabetic keyboard device for use with a telephone dialing circuit.

Telephone dialing is typically effected numerically through the assignment of individualized telephone numbers. Historically, however, the digits 2-9 have been assigned three (3) alphabetic letters allowing alphanumeric designations. The standard 12-key telephone keypad provides the following alphabetic representations for the numeric keys.

| 1 -     | 2 - ABC | 3 - DEF |
| 4 - GHI | 5 - JKL | 6 - MNO |
| 7 - PRS | 8 - TUV | 9 - WXY |
| * -     | 0 -     | # -     |

Often letters and words have been used to identify telephone numbers. Advantageously, this is done to make telephone numbers easy to memorize and for marketing purposes. Also, with greater business usage of wide-area telecommunications services (WATS), more and more businesses have been creative in the selection of their telephone numbers. Numerous examples of alphabetically represented telephone numbers exist, some of which include: 1-800-FLOWERS, 1-800-DOCTORS, 1-800-COLLECT, 1-800-OPERATOR. Further examples may be found for non-WATS telephone service as well. Moreover, many automated telephone answering and messaging systems such as voice mail services and stock quote services utilize alphanumeric key entry for selecting service options and for identifying, e.g., persons or securities, etc.

A problem exists in that the logical mapping of alphabetic numbers to a numeric telephone number sequence is not natural and often makes tedious the otherwise simple operation of dialing a telephone, not withstanding the ease of memorizing the alphabetic representations. Furthermore, the user's translation or mapping of alphabetic representations to numeric telephone numbers often results in misdialing.

It would be desirable therefore to provide an alphabetic keypad for use with a telephone which simplifies translation of alphabetic telephone number representations or actually makes it unnecessary for the user to undertake such translation prior to dialing the telephone.

SUMMARY OF THE INVENTION

The present invention simplifies the task of dialing alphabetic or alphanumeric telephone numbers by providing an alphabetic keyboard to supplement the standard 12-key telephone dialing keypad. This alphabetic keyboard generates dual-tone-multi-frequency (DTMF) and/or pulse dialing signals associated with the corresponding keys in a standard telephone keypad or dial.

The individual assignment of alphabetic keys to numeric digits according to the present invention makes translation or mapping of alphabetic representations to numeric telephone numbers transparent to the user. The resulting dialer apparatus and method of dialing with an alphabetic keyboard thus avoids the problems of the prior art. To achieve simplified translation of alphabetic telephone number representations making it unnecessary for the user to undertake such translation and making the task less tedious and avoiding misdialing problems among other things, in accordance with the present invention as embodied and described herein, there is provided a telephone dialing apparatus and method for sending dialing signals over a communication path connecting a telephone to a switching office.

The apparatus in accordance with the present invention comprises a telephone dialing circuit having plural first inputs, plural second inputs and an output, connections between one of said first inputs and one of said second inputs generating a telephone dialing signal at the output. An alphabetic keyboard device has switch contacts each corresponding to a letter of the alphabet assigned to a key which connects one of the first inputs and one of the second inputs together at said telephone dialing circuit to generate the dialing signal at the output of the telephone dialing circuit. Means are provided for coupling the telephone dialing signal from the output of the telephone dialing circuit to the communication path.

It is to be understood that both the foregoing general description and the following detailed description are exemplary only and not restrictive of the invention as claimed.

DETAILED DESCRIPTION OF THE PREFERRED EMBODIMENT

Figure 1:
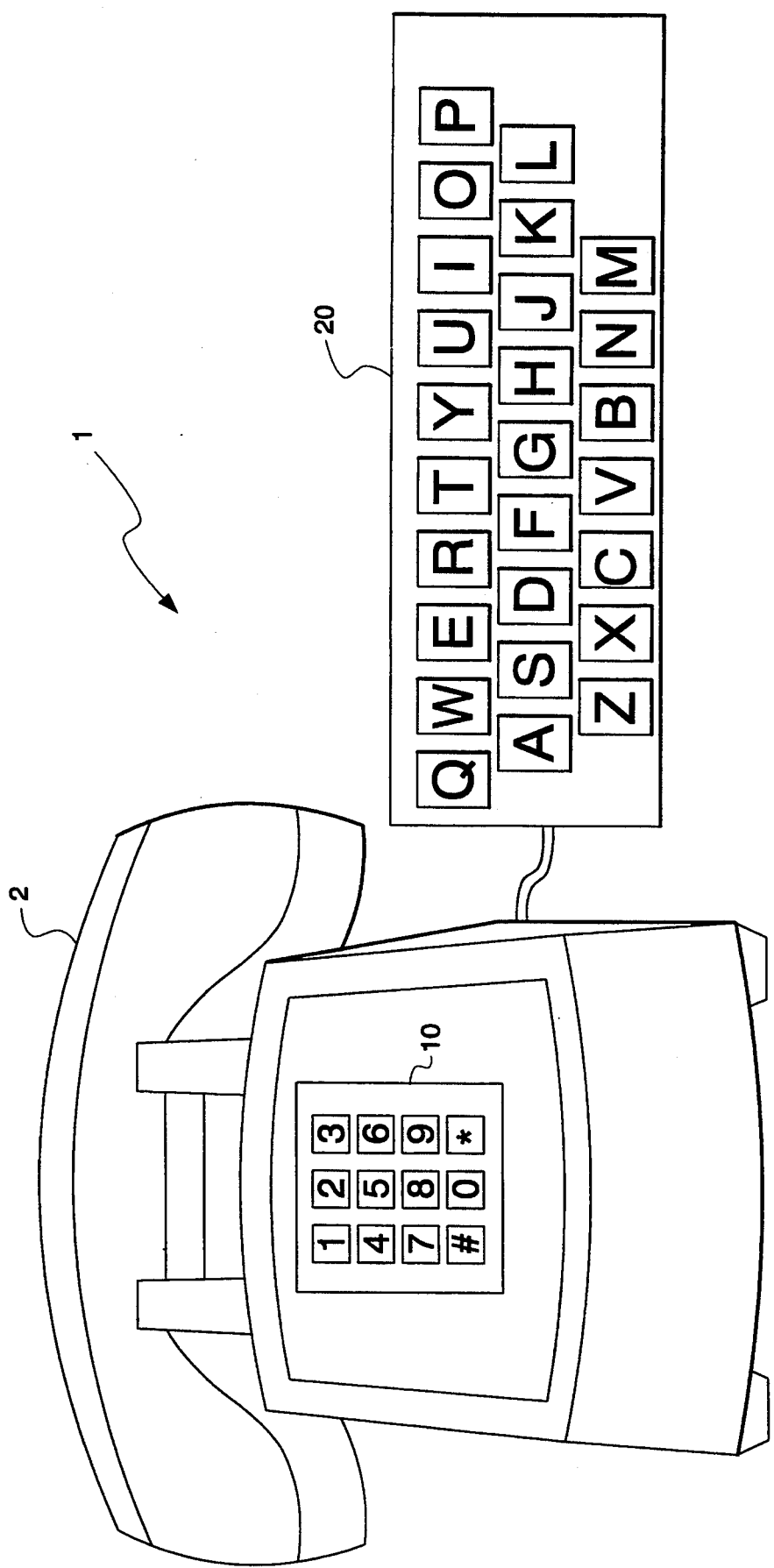
FIG. 1 is a view in perspective of a telephone and alphabetic telephone dialer apparatus incorporating the present invention.

Reference will now be made in detail to the present preferred embodiment of the invention, an example of which is illustrated in FIG. 1. As depicted in FIG. 1, telephone apparatus generally identified by reference numeral 1 comprises a telephone 2 having a numeric keypad 10. As embodied herein, an alphabetic keyboard 20 is connected to the telephone 2 as an external add-on device. Of course, in an alternate embodiment, the alphabetic keyboard 20 may be provided integral with the telephone 2 by being housed therein.

Figure 2:
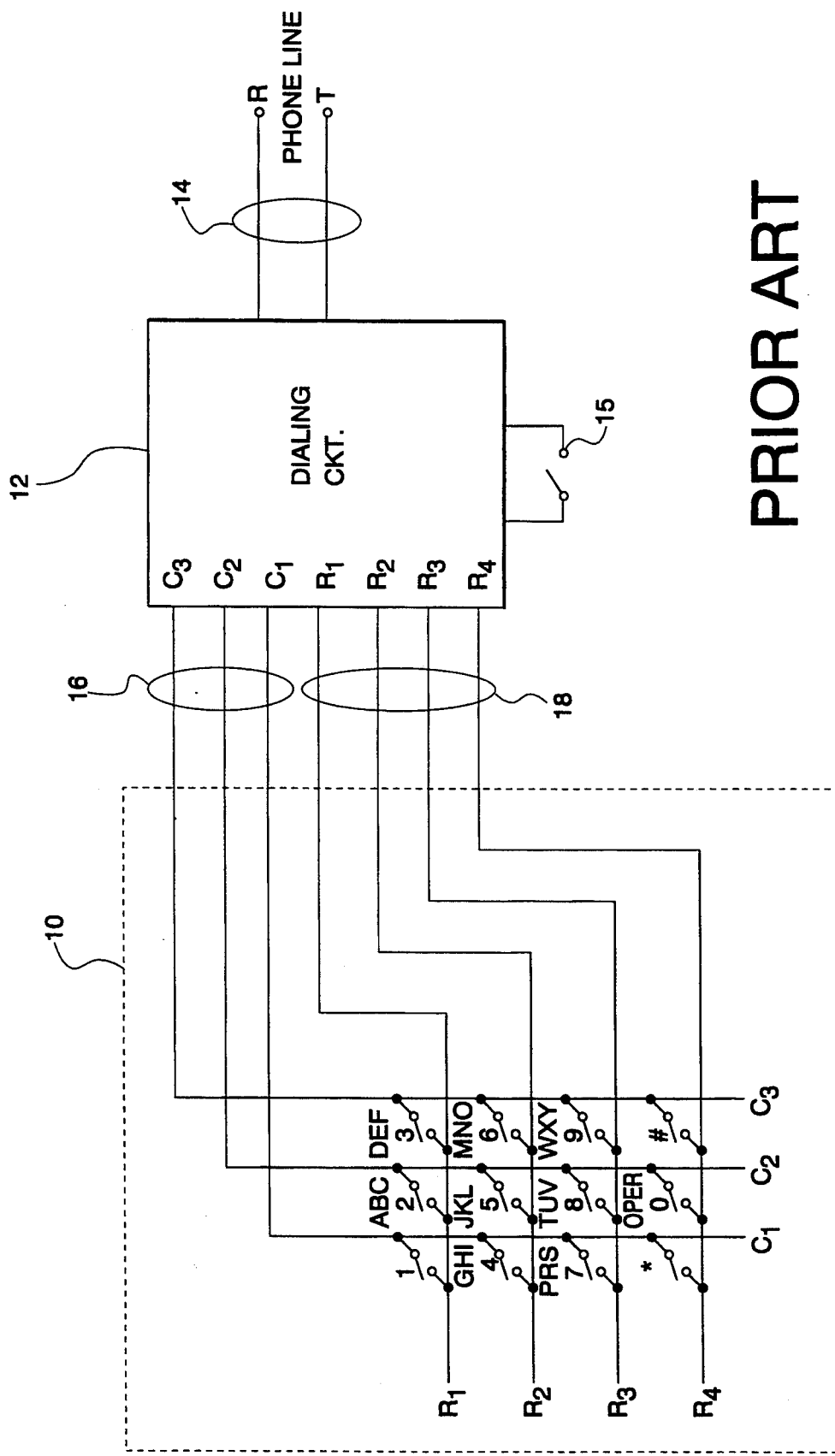
FIG. 2 is a schematic diagram of a prior art telephone dialing apparatus.
Figure 3:
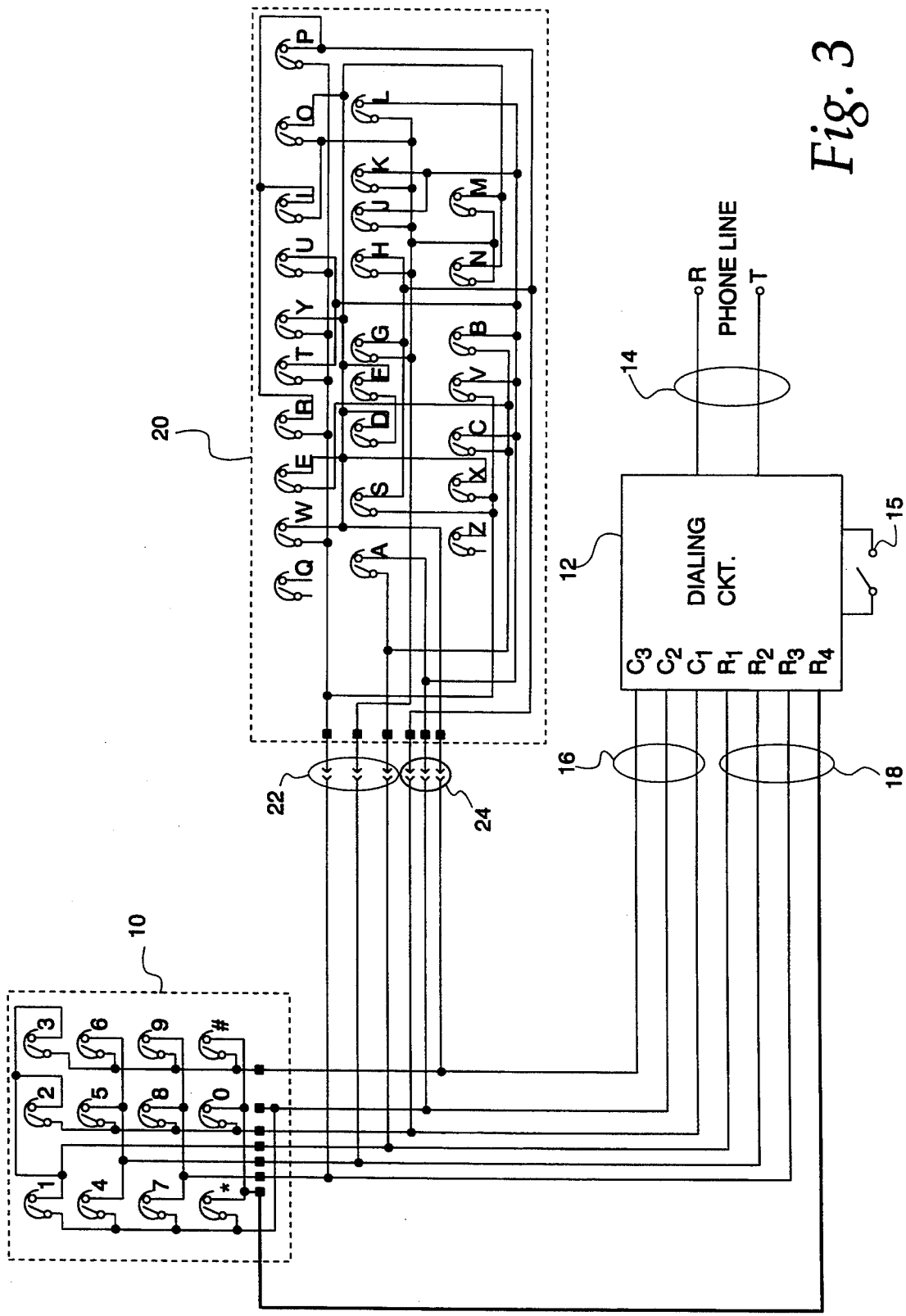
FIG. 3 is a schematic diagram of a telephone dialing apparatus in accordance with the present invention.

A prior art telephone dialing apparatus, found in a conventional telephone set such as telephone 2, is illustrated in the simplified schematic diagram of FIG. 2. FIG. 2 includes a 12-key standard keypad for a conventional telephone having alpha-numeric keys organized in four (4) rows ($R_1$-$R_4$) and three (3) columns ($C_1$-$C_3$) designated as the numeric keypad 10. A dialing circuit 12 and a telephone line tip ring pair 14 (T = tip, R = ring) are provided for connection via the telephone line which connects to a communication path and switching office such as the local loop connecting the conventional subscriber telephone to a central office. Of course a hybrid or speech network and switch hook are also connected across the tip ring pair 14 in a conventional telephone set which would also include a transmitter and a receiver in a handset for the user. The standard configuration of a telephone set is well understood in the art, thus it is unnecessary to set forth in detail all of the components as configured therein and so FIGS. 2 and 3 are simplified to focus only on telephone dialing circuitry. See Fike, J.L., Friend G.E., "Understanding Telephone Electronics", (Howard W. Sams & Co. 1984)

The dialing circuit 12 is a conventional telephone dialing circuit typically available as an integrated circuit package providing dual-tone-multifrequency (DTMF) and/or pulse telephone dialing signals at the output of the dialing circuit 12 for transmission on the tip ring pair 14. A switch 15 causes the output of the dialing circuit 12 to switch between DTMF and pulse signal generation. The dialing circuit 12 has inputs 16 and 18 for the three columns and four rows, respectively, of a 12-key standard keypad such as keypad 10, wherein connections between rows and columns present a digit entry via inputs 16 and 18 causing the dialing circuit 12 to output a telephone dialing signal over the tip ring pair 14.

Referring now to FIG. 3, an apparatus for telephone dialing embodying the present invention is shown. The embodiment of FIG. 3 includes the numeric keypad 10, the dialing circuit 12 and tip ring pair 14, and further includes the alphabetic keyboard 20. The alphabetic keyboard 20 connects to the numeric keyboard 10 and the dialing circuit 12 at the column input 16 and the row inputs 18 via 6 wiring connections wherein the three column connections are generally referenced by reference numeral 24 and the first three row connections ($R_1$–$R_3$) are generally referenced by reference numeral 22. Connections 22 and 24 may include any connecting means and in the embodiment electrical connectors and a six conductor ribbon cable is employed to establish connections 22 and 24.

In accordance with the invention there is provided a telephone apparatus for sending dialing signals over a communication path connecting a subscriber telephone to a switching office, as shown in FIG. 3. The apparatus comprises a telephone dialing circuit having plural first inputs, plural second inputs and an output, connections between one of said first inputs and one of said inputs generating a telephone dialing signal at the output. As embodied herein, the telephone dialing circuit is dialing circuit 12 which includes a family of integrated circuits for either dual-tone-multi-frequency (DTMF) or pulse signal generation. The switch 15 is provided to switch between DTMF and pulse signalling. A Texas Instruments TCM1101 integrated circuit chip provides a typical dialing circuit for pulse dialing and the TCM5087 (MK5087) is a typical DTMF integrated circuit. See "Understanding Telephone Electronics," Ch. 4 on Electronic Dialing and Ringing Circuits. One skilled in the art will appreciate that in other embodiments various types of different conventional switch signalling may also be generated by the dialing circuit 12. Activation of dialing tones or pulses at the output of the dialing circuit 12 is accomplished when the user depresses a key on the keypad 10. The keypad 10 contacts provide a connection between a column and a row at inputs 16 and 18, respectively, of the dialing circuit 12.

There is also provided an alphabetic keyboard device having switch contacts each corresponding to a single letter of the alphabet assigned to a key which connects one of said first inputs and one of second inputs together at said telephone dialing circuit to generate the dialing signal at the output of said telephone dialing circuit. As embodied herein, the alphabetic keyboard device is the keyboard 20 having outputs at connections 22 and 24 for connecting with the keypad 10 and the dialing circuit 12. In the embodiment the keyboard 12 is a modified IBM PC-Junior keyboard and the printed circuit board (PCB) associated therewith. The keyboard 20 as shown is configured to utilize a conventional typewriter QWERTY keyboard layout, but any arrangement of the keys would fall within the scope of the invention.

There is provided means for coupling the telephone dialing signal from the output of said telephone dialing circuit to the communication path which, as embodied herein, is the tip ring pair 14 which is connected at the output of the dialing circuit 12 to the telephone line in a conventional manner.

As shown in FIG. 3, the apparatus includes the keypad 10 which in the embodiment is a Premier telephone set model No. HACD-2500 connected using a 6-wire ribbon cable. The embodiment of FIG. 3 illustrates the keyboard 20 as a supplement to the keypad 10 of a standard telephone set such as telephone 2. More particularly, as can be appreciated in FIG. 3, the keyboard 20 is an alphabetic keyboard device for use with the telephone dialing circuit 12 which has plural first inputs and plural second inputs 16 and 18. The keyboard 20 comprises switch contacts, each corresponding to a single letter of the alphabet assigned to a key which is connectable with one of the first inputs and one of the second inputs of the dialing circuit 12 at inputs 16 and 18 to connect said one of the first inputs and said one of the second inputs together. Connections are made from the output of the keyboard via connections at 22 and 24, as discussed above.

As should be appreciated from the above described apparatus, a method for use therewith comprises the steps of providing an alphabetic keyboard, e.g., keyboard 20, having a single letter assigned to each key relating to a numeric digit according to the alphanumeric digits on a standard set as follows.

| 1 - | 2 - ABC | 3 - DEF |
|---|---|---|
| 4 - GHI | 5 - JKL | 6 - MNO |
| 7 - PRS | 8 - TUV | 9 - WXY |
| * - | 0 - | # - |

By depressing a key on the keyboard 20 the user may then generate a telephone dialing signal responsive to the depressing step, wherein the signal corresponds to a numeric digit determined according to the relating step.

As described, the apparatus and method for using the same permits the use of an alphabetic keyboard 20 to supplement the standard 12-key telephone keypad 10 or any similar dial or keypad so that the alphabetic keyboard can be used as an extended dialing device. The alphabetic keyboard 20 thus will generate DTMF tones or pulses as will the standard 12-key telephone keypad 10. The telephone dialing signals generated at tip ring pair 14 are conventional DTMF or pulse dialing signals. The alphabetic keypad can be connected to the telephone system or provided as a standard-alone telephone dialing signal generator.

The apparatus allows telephone users to use alphabetic keys to dial a telephone number that is known as having an alphabetical representation. As can be appreciated, the alphabetic keyboard 20 dials the telephone by linking each of the three alphabetic letters to the associated numeric key according to convention. Depressing A, B or C in the alphabetic keyboard 20 is therefore equivalent to depressing key #2 in the keypad 10; depressing D, E or F is equivalent to depressing key #3, and so on. Note that the digits 0 and 1 are not associated with any alphabetic keys in the keyboard 20, neither alphabetic letters Q and Z are associated with any numeric keys, as is consistent with a conventional telephone. Since keys 0, *, # are not associated with alphabetic letters, the connection of of inputs 18 of the dialing circuit 12 is connected directly from the keypad 10 to dialing circuit without need for connection with the keyboard 20.

Other embodiments of an alphabetic telephone dialing apparatus and method will be apparent to those skilled in the art from consideration of the specification and practice of the invention disclosed herein. It is intended therefore that the specification and examples be considered as exemplary only with a true scope and spirit of the invention being indicated by the following claims.

What is claimed is:

1. A telephone dialing apparatus for sending dialing signals over a communication path connecting a telephone to a switching office, the apparatus comprising:
   a telephone dialing circuit having plural first inputs, plural second inputs and an output, connections between one of said first inputs and one of said second inputs generating a telephone dialing signal at the output in accordance with a predetermined telephone dialing plan;
   an alphabetic keyboard device having a plurality of switch contacts each corresponding to a single letter of the alphabet assigned to an alphabetic key, which switch contacts connect one of said first inputs and one of said second inputs together at said telephone dialing circuit to generate the dialing signal at the output of said dialing circuit, said alphabetic keyboard device being connected to said first and second inputs in accordance with predetermined mapping of alphabetic representations to numeric keys provided on a standard 12-key telephone keypad by assigning a single letter to each of said alphabetic keys for generating the dialing signal at the output of said dialing circuit; and
   means for coupling the telephone dialing signal from the output of said telephone dialing circuit to the communication path.

2. An apparatus in accordance with claim 1 further comprising a numeric keypad having numeric keys each of which connect one of said first inputs and one of said second inputs together at said telephone dialing circuit to generate the dialing signal at the output of said telephone dialing circuit.

3. An apparatus in accordance with claim 1 wherein said telephone dialing circuit generates a dual-tone-multi-frequency (DTMF) telephone dialing signal.

4. An apparatus in accordance with claim 1 wherein said telephone dialing circuit generates a pulse telephone dialing signal.

5. An apparatus in accordance with claim 1 wherein said alphabetic keyboard device comprises alphabetic keys organized according a standard typewriter QWERTY keyboard layout.

6. An alphabetic keyboard device for use with a telephone dialing circuit having plural first inputs and plural second inputs, the keyboard device comprising a plurality of switch contacts each corresponding to a single letter of the alphabet assigned to an alphabetic key, which switch contacts are connectable with one of the first inputs and with one of the second inputs of the dialing circuit to connect said one of the first inputs and said one of the second inputs together, said alphabetic keyboard device being connected to said first and second inputs in accordance with predetermined mapping of alphabetic representations to numeric keys provided on a standard 12-key telephone keypad by assigning a single letter to each of said alphabetic keys for generating the dialing signal at the output of said dialing circuit.

7. A device in accordance with claim 6 comprising first outputs and second outputs connectable to said first inputs and second inputs of said telephone dialing circuit.

8. A device in accordance with claim 7 wherein said first outputs and said second outputs comprise connection means for coupling said switch contacts to corresponding numeric keys on a 12-key standard keypad of a conventional telephone.

9. A device in accordance with claim 8 wherein three of said switch contacts each corresponding to a single letter of the alphabet assigned to a key are coupled to a single numeric digit on said 12-key standard keypad of said conventional telephone.

10. A device in accordance with claim 9 wherein the alphabetic keys are configured according to a standard typewriter QWERTY keyboard layout.

11. A telephone dialing method comprising the steps of:
   providing an alphabetic keyboard having a single alphabetic letter assigned to one of a plurality of switch contacts, each alphabetic key of the alphabetic keyboard corresponding to different letters thereon;
   relating each key of the alphabetic keyboard to a numeric digit in accordance with a predetermined dialing plan;
   connecting the switch contacts in accordance with predetermined mapping of alphabetic representations to numeric keys provided on a standard 12-key telephone keypad by assigning a single letter to each of said alphabetic keys; and
   generating a telephone dialing signal responsive to depression of a key on said alphabetic keyboard and said connecting step, said signal corresponding to a numeric digit determined according to said providing step.

12. A method in accordance with claim 11 wherein said providing step provides alphabetic keys configured according to a conventional typewriter QWERTY keyboard layout.

13. A method in accordance with claim 11 wherein said providing step relates the A, B and C keys to the numeric digit 2, and D, E and F keys to the numeric digit 3, the G, H, and I keys to the numeric digit 4, the J, K and L keys to the numeric digit 5, the M, N and O keys to the numeric digit 6, the P, R and S keys to the numeric digit 7, the T, U and V keys to the numeric digit 8, and the W, X and Y keys to the numeric digit 9.

14. A method in accordance with claim 13 wherein said generating step generates a dual-tone-multifrequency (DTMF) telephone dialing signal.

15. A method in accordance with claim 13 wherein said generating step generates a pulse telephone dialing signal.

* * * * *

UNITED STATES PATENT AND TRADEMARK OFFICE
CERTIFICATE OF CORRECTION

PATENT NO. : 5,388,154
DATED : February 7, 1995
INVENTOR(S) : William Solomon

It is certified that error appears in the above-indentified patent and that said Letters Patent is hereby corrected as shown below:

IN THE CLAIMS:

Column 6, line 55, change "and" (1st Occur.) to read --the--.

Column 6, line 62, after "multi" insert a hyphen "-".

Signed and Sealed this

Fifteenth Day of August, 1995

Attest:

BRUCE LEHMAN

Attesting Officer  Commissioner of Patents and Trademarks

Adverse Decisions In Interference

Patent No. 5,388,154, William Solomon, ALPHABETIC TELEPHONE DIALER APPARATUS AND METHOD, Interference No. 103,790, final judgment adverse to the patentee rendered February 24, 2000, as to claims 1-15.

*(Official Gazette October 10, 2000)*